(12) United States Patent
Le et al.

(10) Patent No.: US 9,027,221 B2
(45) Date of Patent: May 12, 2015

(54) METHOD FOR MANUFACTURING COMPOUND REFRACTIVE LENS FOR FOCUSING X-RAYS IN TWO DIMENSIONS

(71) Applicants: Zichun Le, Hangzhou (CN); Wen Dong, Hangzhou (CN)

(72) Inventors: Zichun Le, Hangzhou (CN); Wen Dong, Hangzhou (CN)

(73) Assignee: Zhejiang University of Technology, Hangzhou (CN)

( * ) Notice: Subject to any disclaimer, the term of this patent is extended or adjusted under 35 U.S.C. 154(b) by 6 days.

(21) Appl. No.: 14/027,201

(22) Filed: Sep. 14, 2013

(65) Prior Publication Data

US 2014/0013573 A1   Jan. 16, 2014
US 2014/0250666 A9   Sep. 11, 2014

Related U.S. Application Data

(63) Continuation-in-part of application No. PCT/CN2011/075747, filed on Jun. 14, 2011.

(30) Foreign Application Priority Data

Mar. 16, 2011   (CN) .......................... 2011 1 0063257

(51) Int. Cl.
  *B23P 17/04*   (2006.01)
  *G21K 1/06*    (2006.01)
  *G02B 27/62*   (2006.01)

(52) U.S. Cl.
  CPC ............ *B23P 17/04* (2013.01); *Y10T 29/49885* (2015.01); *G02B 27/62* (2013.01); *G21K 1/065* (2013.01); *G21K 2201/067* (2013.01)

(58) Field of Classification Search
  USPC .................... 29/458, 460, 428; 359/364, 365; 378/34, 35; 250/370.09
  See application file for complete search history.

(56) References Cited

U.S. PATENT DOCUMENTS 6,091,798 A  *  7/2000  Nygren et al. ................... 378/84
6,674,583 B2 *  1/2004  Beguiristain et al. ......... 359/754

* cited by examiner

*Primary Examiner* — John C Hong
(74) *Attorney, Agent, or Firm* — Matthias Scholl P.C.; Matthias Scholl

(57) ABSTRACT

A method for manufacturing a compound refractive lens for focusing X-rays in two dimensions. The method includes the following steps: 1) manufacturing a mother lens; 2) manufacturing a daughter lens; and 3) assembling the mother lens and the daughter lens. The assembly of the mother lens and the daughter lens includes: aligning square embedded lens bodies of the daughter lens with square holes of the mother lens, respectively, for allowing the first parabola-shaped holes on the mother lens and the second parabola-shaped holes on the daughter lens to form an orthogonal structure; and inserting and pressing the square embedded lens bodies into the corresponding square holes, respectively. The method of the invention has advantages of high-precision for manufacturing and calibration of optical axis, and meanwhile the compound refractive lens manufactured based the method has high X-rays focusing efficiency.

4 Claims, 2 Drawing Sheets

METHOD FOR MANUFACTURING COMPOUND REFRACTIVE LENS FOR FOCUSING X-RAYS IN TWO DIMENSIONS

CROSS-REFERENCE TO RELATED APPLICATIONS

This application is a continuation-in-part of International Patent Application No. PCT/CN2011/075747 with an international filing date of Jun. 14, 2011, designating the United States, now pending, and further claims priority benefits to Chinese Patent Application No. 201110063257.8 filed Mar. 16, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a microstructure optical device for focusing X-rays, and more particularly to a method for manufacturing a parabolic type metallic compound refractive lens for focusing X-rays in two dimensions (2D).

2. Description of the Related Art

The original compound refractive lens for focusing X-rays is manufactured by a drilling method to drill an aluminum material to produce tens and hundreds of cylindrical bores arranged in order. X-rays is one-dimensionally focused, based on which, X-ray detection and diagnostic techniques are carried out. In order to improve the production precision, planar micro manufacturing technology (containing film deposition, optical lithography, electron beam lithography, ion beam lithography) is mostly employed to manufacture the compound refractive lens for focusing X-rays having a cross section in a circular, a parabolic, and a ellipsoid shape. Materials for manufacturing the compound refractive lens include aluminum, silicon, lithium, boron, carbon, aluminum oxide, and organic materials PMMA, so that the focus effect is highly improved, but the compound refractive lens is still one-dimensionally focused. However, in technical fields including X-ray detection and diagnostic techniques, X-ray detection spot (focal spot) is required within a micron or a sub-micron level rather than a focusing line. Thus, a compound refractive lens for focusing X-rays in two dimensions is necessitated.

Two typical methods for focusing of X-rays in two dimensions are described below. The first typical method includes: orthogonally placing two compound refractive lenses for focusing X-rays in one dimension; linearly focusing the X-ray beam in a horizontal direction and a vertical direction, respectively, thereby realizing the purpose of focusing X-rays in two dimensions. This method only requires manufacturing of one-dimensional compound refractive lens for focusing X-rays and does not relate to the manufacturing technology for the compound refractive lens for focusing X-rays in two dimensions. The second typical method is employing modeling technology to manufacture a compound refractive lens for focusing X-rays in two dimensions, that is, employing precise manufacturing technology to manufacture a die of lens refraction unit in a shape of paraboloid of revolution, pressing the aluminum material to form individual compound lens refraction units, and finally arranging the individual compound lens refraction units to form permutations and combinations, thus, the compound refractive lens for focusing X-rays in two dimensions is produced.

SUMMARY OF THE INVENTION

In view of the above-described problems, it is one objective of the invention to provide a method for manufacturing a compound refractive lens for focusing X-rays in two dimensions that has high manufacturing accuracy, high auto-calibration accuracy of the optical axis of the lens, and high focusing efficiency.

To achieve the above objective, in accordance with one embodiment of the invention, there is provided a method for manufacturing a compound refractive lens for focusing X-rays in two dimensions, the compound refractive lens comprising a mother lens and a daughter lens, and the method comprising preparation of the mother lens, preparation of the daughter lens, and assembly of the mother lens and the daughter lens:

1) the preparation of the mother lens, comprising:
   a) using a glass substrate-chrome material to prepare a photolithographic mask of the mother lens by using an electron beam lithography; the photolithographic mask of the mother lens comprising a plurality of first parabola-shaped holes and a plurality of square holes arranged coaxially at intervals; a cross section of each of the first parabola-shaped holes being formed by connecting openings of two symmetrical parabolas; the number of the square holes being n, and a side length of the square hole being $1+\delta$, wherein n is an integer from 20 and 100, and $\delta$ is within the range of between 1 and 2 μm;
   b) cleaning a glass substrate;
   c) depositing a copper, aluminum, or gold film on the cleaned glass substrate as an electroforming cathode film using a sputtering method or an evaporation method;
   d) spin coating a layer of a BP212 positive photoresist on the electroforming cathode film; baking, and curing the positive photoresist;
   e) spin coating a layer of a SU-8 photoresist having a thickness of 1 on the BP212 positive photoresist;
   f) exposing, developing, and hardening the coated SU-8 photoresist, and using the photolithographic mask of the mother lens prepared in step a);
   g) washing a first sample piece obtained from step f), and removing an exposed BP212 positive photoresist from an upper surface;
   h) placing the first sample piece treated by step g) in an electroforming solution for electroforming; and the electroforming material being copper, nickel, iron, or chromium;
   i) taking the first sample piece out of the electroforming solution when a thickness of the electroforming metal is the same as the thickness of the SU-8 photoresist, that is 1; and washing the first sample piece to remove remaining electroforming solution;
   j) immersing the first sample piece in an acetone solution; removing the BP212 positive photoresist and the SU-8 photoresist adhering on it to yield the mother lens of the compound refractive lens for focusing X-rays;
2) the preparation of the daughter lens, comprising:
   k) using a glass substrate-chrome material to prepare a photolithographic mask of the daughter lens by using the electron beam lithography; the photolithographic mask of the daughter lens comprising a clamping arm and a plurality of square embedded lens bodies coaxially arranged on the clamping arm; the number of the square embedded lens bodies is n, which is the same as the number of the square holes of the mother lens; each of the square embedded lens bodies comprising a second parabola-shaped hole having a cross section formed by connecting openings of two symmetrical parabolas; a center of the second parabola-shaped hole and a center of the square embedded lens body coincide; the square embedded lens body has a side length of 1; the square embedded lens body and the clamping arm are integrated as a whole body; and a thickness of the clamping arm being t;

l) cleaning a silicon substrate;

m) spin coating a layer of BP212 photoresist on a surface of the silicon substrate; and pre-baking to yield a second sample piece;

n) depositing a copper, aluminum, or gold film on the second sample piece obtained from step m) as an electroforming cathode film using the sputtering method or the evaporation method;

o) spin coating a layer of KMP C5315 photoresist on the second sample piece from step n);

p) spin coating a layer of SU-8 photoresist having a thickness of 1 on the second sample piece from step o);

q) exposing, developing, and hardening the coated SU-8 photoresist, and using the photolithographic mask of the daughter lens prepared in step k);

r) removing an exposed KMP C5315 photoresist from an upper surface using a degumming agent of KMP C5315;

s) placing the second sample piece treated by step r) in an electroforming solution for electroforming; and the electroforming material being copper, nickel, iron, or chromium but different from the material of the electroforming cathode film;

t) taking the second sample piece out of the electroforming solution when a thickness of the electroforming metal is the same as the thickness of the SU-8 photoresist, that is 1; and washing the second sample piece to remove remaining electroforming solution;

u) immersing the second sample piece in an acetone solution; removing the KMP C5315 photoresist and the SU-8 photoresist adhering on it, and meanwhile removing the BP212 photoresist and the silicon substrate;

v) removing the electroforming cathode film from the second sample piece after treatment of step u) using a method of chemical etching to yield the daughter lens of the compound refractive lens for focusing X-rays; and 3) the assembly of the mother lens and the daughter lens, comprising:

w) placing the mother lens and the daughter lens beneath a microscope, finding and clamping the clamping arm of the daughter lens, aligning the square embedded lens bodies of the daughter lens with the square holes of the mother lens, respectively, for allowing the first parabola-shaped holes and the second parabola-shaped holes to form an orthogonal structure and allowing the n square embedded lens bodies of the daughter lens to fit the n square holes of the mother lens, respectively; and inserting and pressing the square embedded lens bodies into the corresponding square holes, respectively.

In a class of this embodiment, a distance between the center of the first parabola-shaped hole and the center of the square hole in step a) is 1. A distance between adjacent square embedded lens bodies in step k) is 1.

In a class of this embodiment, major axes of the first parabola-shaped hole and the second parabola-shaped hole are between 42 and 242 µm; minor axes of the first parabola-shaped hole and the second parabola-shaped hole are between 32 and 222 µm; 1 is in a range of between 50 and 250 µm; and t is in a range of between 50 and 100 µm.

The compound refractive lens for focusing X-rays in two dimensions comprise: the glass substrate, the mother lens disposed on the glass substrate. The mother lens comprises: a main body of the mother lens, the first parabola-shaped cavities having the cross section formed by connecting openings of the two symmetrical parabolas, and the square cavities. The first parabola-shaped cavities and the square cavities are arranged in order at intervals on the main body of the mother lens. Centers of the first parabola-shaped cavities and centers of the square cavities are arranged in a line along the length of the main body of the mother lens. The first parabola-shaped cavity comprises the first paraboloid for refracting the X-ray and focusing the X-ray along the minor axis of the first parabola-shaped cavity. Each of the square cavities accommodates a daughter lens body having a cross section of the square. The daughter lens body comprises the second parabola-shaped cavities formed by connecting openings of two symmetrical parabolas. The second parabola-shaped cavity comprises the second paraboloid for refracting the X-ray and focusing the X-ray along the minor axis of the second parabola-shaped cavity. The first paraboloid and the second paraboloid form an orthogonal structure.

Equation of the two parabolas of the first parabola-shaped cavity is represented by $x^2=2Rz$, and equation of the two parabolas of the second parabola-shaped cavity is represented by $y^2=2Rz$, in which, R represents radius of curvature at the vertex of the parabolas; x, y, and z represent the x axis, the y axis, and the z axis in a rectangular coordinate system, respectively; the major axis and the minor axis of the first parabola-shaped cavity and the second parabola-shaped cavity are calculated by the above equations.

A plurality of the embedded lens bodies are arranged on the clamping arm. A distance between centers of adjacent embedded lens bodies is equal to a distance between centers of adjacent square cavities. The embedded lens body is in the form of a cube. The major axis and the minor axis of the second parabola-shaped cavity are both smaller than the side length of the cube. A central line of the cube and a central line of the second parabola-shaped cavity coincide. The side length of the square cavity is larger than the side length of the cube. The depth of the first parabola-shaped cavity and the depth of the square cavity are equal to the side length of the cube. A distance between the center of the square cavity and the center of the first parabola-shaped cavity is equal to the side length of the cube. The major axis of the first parabola-shaped cavity is equal to the major axis of the second parabola-shaped cavity. The minor axis of the first parabola-shaped cavity is or is not equal to the minor axis of the second parabola-shaped cavity.

The mother lens and the daughter lens are assembled under the microscope to form the compound refractive lens for focusing X-rays (as shown in FIG. 1) in two dimensions. The z axis in the coordinate system represents the optical axis of the compound refractive lens for focusing X-rays. The 2D focusing function of the compound refractive lens is realized by a plurality of the 2D focusing and refractive unit (as shown in FIG. 1*c*) which is formed by two perpendicularly arranged parabolas (one is along the y axis, and the other is along the x axis). An incident light of X-ray beam is radiated on the compound refractive lens along the z axis of the coordinate system, after being refracted by a plurality of the 2D focusing and refractive units, the X-ray exits from the compound refractive lens to form a 2D focal spot.

Advantages of the invention are summarized as follows: 1) the method for manufacturing the compound refractive lens for focusing X-rays in two dimensions is used in practical manufacture of the new type of X-ray devices; 2) the compound refractive lens for focusing X-rays produced by the method has the function of focusing the X-ray in two dimensions by means of one lens, meanwhile the lens has the advantages of high precision and convenience; 3) the planar micro manufacturing technology is employed, the device has a large aspect ratio and small restriction on the material; furthermore, the method of the invention realizes the high integration of the device and precise formation for one step.

BRIEF DESCRIPTION OF THE DRAWINGS

The invention is described hereinbelow with reference to the accompanying drawings, in which.

Figure 1A:
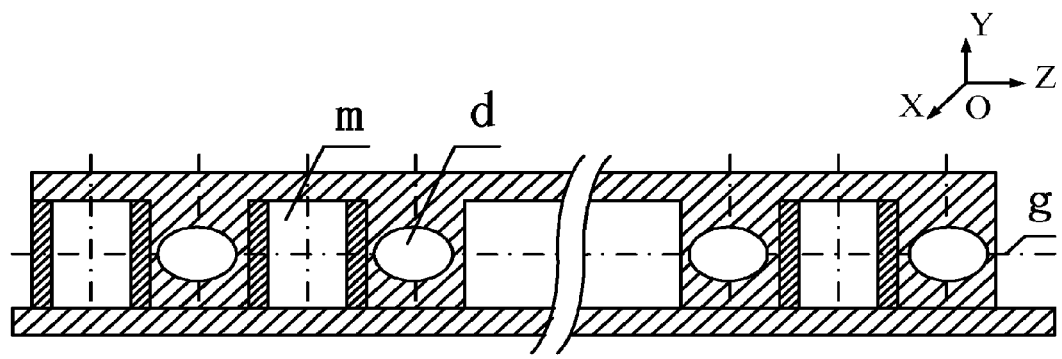
FIG. 1a is a front view of a compound refractive lens for focusing X-rays in two dimensions in accordance with one embodiment of the invention.

In the drawings, the following reference numbers are used: o represents origin of a rectangular coordinate system; x, y, z represent x axis, y axis, and z axis; R represents radius of curvature at a vertex of a parabola; g represents optical axis; m represents mother lens; d represents daughter lens; and a represents a shielding part of a photolithographic mask.

DETAILED DESCRIPTION OF THE EMBODIMENTS

For further illustrating the invention, experiments detailing a method for manufacturing a compound refractive lens for focusing X-rays in two dimensions are described below. It should be noted that the following examples are intended to describe and not to limit the invention.

Example 1

Figure 1B:
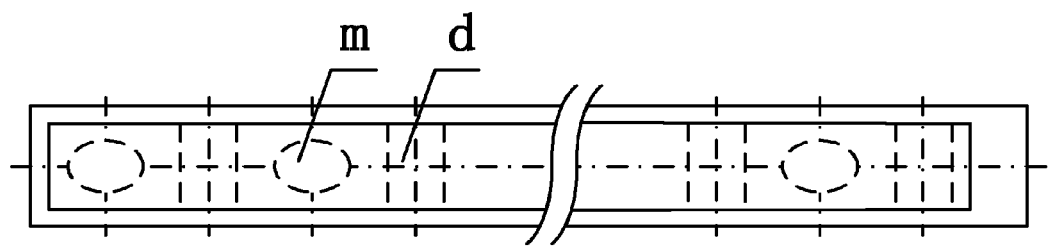
FIG. 1b is a top view of a compound refractive lens for focusing X-rays in two dimensions in accordance with one embodiment of the invention.
Figure 2A:
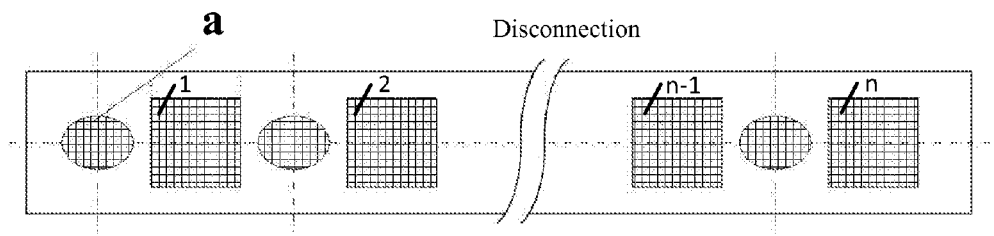
FIG. 2a is a schematic diagram of a photolithographic mask of a mother lens for the compound refractive lens for focusing X-rays in accordance with one embodiment of the invention.
Figure 2B:
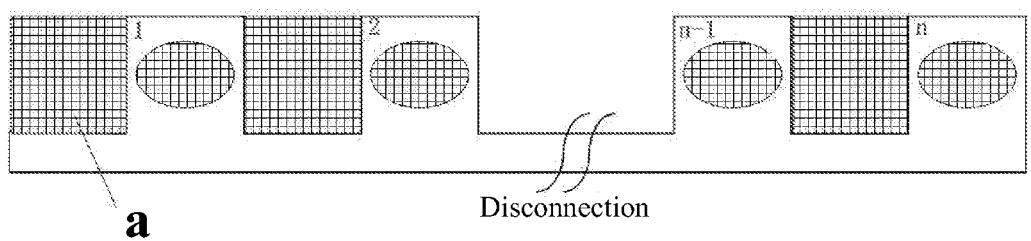
FIG. 2b is a schematic diagram of a photolithographic mask of a daughter lens of a compound refractive lens for focusing X-rays in accordance with one embodiment of the invention.

As shown in FIGS. 1a-2b, a method for manufacturing a compound refractive lens for focusing X-rays in two dimensions, the method comprising the following steps:

1) preparation of a mother lens for the compound refractive lens for focusing X-rays:

a) using a glass substrate-chrome material to prepare a photolithographic mask of the mother lens by using an electron beam lithography; the photolithographic mask of the mother lens comprising a plurality of first parabola-shaped holes and a plurality of square holes arranged coaxially at intervals; a cross section of each of the first parabola-shaped holes being formed by connecting openings of two symmetrical parabolas; equation of the two parabolas of the first parabola-shaped hole being represented by $x^2=2Rz$, in which, R representing radius of curvature at the vertex of the parabolas; x and z representing an x axis and a z axis in a rectangular coordinate system, respectively, as shown in FIG. 1; a major axis and a minor axis of the first parabola-shaped hole being calculated by the above equation; the number of the square holes being n, and a side length of the square hole being $1+\delta$;

b) cleaning a glass substrate;

c) depositing a copper, aluminum, or gold film on the cleaned glass substrate as an electroforming cathode film using a sputtering method or an evaporation method;

d) spin coating a layer of a BP212 positive photoresist on the electroforming cathode film; baking, and curing the positive photoresist;

e) spin coating a layer of a SU-8 photoresist having a thickness of 1 on the BP212 positive photoresist;

f) exposing, developing, and hardening the coated SU-8 photoresist, and using the photolithographic mask of the mother lens prepared in step a);

g) washing a first sample piece obtained from step f), and removing an exposed BP212 positive photoresist from an upper surface;

h) placing the first sample piece treated by step g) in an electroforming solution for electroforming; and the electroforming material being copper, nickel, iron, or chromium;

i) taking the first sample piece out of the electroforming solution when a thickness of the electroforming metal is the same as the thickness of the SU-8 photoresist, that is 1; and washing the first sample piece to remove remaining electroforming solution;

j) immersing the first sample piece in an acetone solution; removing the BP212 positive photoresist and the SU-8 photoresist adhering on it to yield the mother lens of the compound refractive lens for focusing X-rays;

2) preparation of a daughter lens for the compound refractive lens for focusing X-rays:

k) using a glass substrate-chrome material to prepare a photolithographic mask of the daughter lens by using the electron beam lithography; the photolithographic mask of the daughter lens comprising a clamping arm and a plurality of square embedded lens bodies coaxially arranged on the clamping arm; the number of the square embedded lens bodies is n, which is the same as the number of the square holes of the mother lens; each of the square embedded lens bodies comprising a second parabola-shaped hole having a cross section formed by connecting openings of two symmetrical parabolas; equation of the two parabolas of the second parabola-shaped hole being represented by $y^2=2Rz$, in which, R representing radius of curvature at the vertex of the parabolas; y and z representing a y axis and the z axis in a rectangular coordinate system, respectively, as shown in FIG. 1; a major axis and a minor axis of the second parabola-shaped hole being calculated by the above equation; a center of the second parabola-shaped hole and a center of the square embedded lens body coincide; the square embedded lens body has a side length of 1; the square embedded lens body and the clamping arm are integrated as a whole body; and a thickness of the clamping arm being t;

l) cleaning a silicon substrate;

m) spin coating a layer of BP212 photoresist on a surface of the cleaned silicon substrate; and pre-baking to yield a second sample piece;

n) depositing a copper, aluminum, or gold film on the second sample piece obtained from step m) as an electroforming cathode film using the sputtering method or the evaporation method;

o) spin coating a layer of KMP C5315 photoresist on the second sample piece from step n);

p) spin coating a layer of SU-8 photoresist having a thickness of 1 on the second sample piece from step o);

q) exposing, developing, and hardening the coated SU-8 photoresist, and using the photolithographic mask of the daughter lens prepared in step k);

r) removing an exposed KMP C5315 photoresist from an upper surface using a degumming agent of KMP C5315;

s) placing the second sample piece treated by step r) in an electroforming solution for electroforming; and the electroforming material being copper, nickel, iron, or chromium but different from the material of the electroforming cathode film;

t) taking the second sample piece out of the electroforming solution when a thickness of the electroforming metal is the same as the thickness of the SU-8 photoresist, that is 1; and washing the second sample piece to remove remaining electroforming solution;

u) immersing the second sample piece in an acetone solution; removing the KMP C5315 photoresist and the SU-8 photoresist adhering on it, and meanwhile removing the BP212 photoresist and the silicon substrate;

v) removing the electroforming cathode film from the second sample piece after treatment of step u) using a method of chemical etching to yield the daughter lens of the compound refractive lens for focusing X-rays; and 3) the assembly of the mother lens and the daughter lens, comprising:

w) placing the mother lens and the daughter lens beneath a microscope, finding and clamping the clamping arm of the daughter lens, aligning the square embedded lens bodies of the daughter lens with the square holes of the mother lens, respectively, for allowing the first parabola-shaped holes and the second parabola-shaped holes to form an orthogonal structure and allowing the n square embedded lens bodies of the daughter lens to fit the n square holes of the mother lens, respectively; and inserting and pressing the square embedded lens bodies into the corresponding square holes, respectively.

A distance between the center of the first parabola-shaped hole and the center of the square hole in step a) is 1. A distance between adjacent square embedded lens bodies in step k) is 1.

The compound refractive lens for focusing X-rays of the example comprises: the glass substrate, the mother lens disposed on the glass substrate, and the daughter lens embedded in the mother lens (as shown in FIG. 1). The glass substrate functions a base of the compound refractive lens for focusing X-rays, and the manufacturing of the mother lens is performed on the glass substrate. The mother lens comprises a body material of the mother lens, and the first parabola-shaped cavities and the square cavities arranged in order at intervals on the body material. The square cavities are used for accommodating the daughter lens. The daughter lens comprises the clamping arm and the embedded lens bodies. The embedded lens bodies are in the square shapes; and a second parabola-shaped cavity is disposed in a center of each of the square embedded lens bodies. The embedded lens bodies of the daughter lens are inserted into the square cavities of the mother lens from an upper of the mother lens. The first parabola-shaped cavity of the mother lens and a paraboloid of the second parabola-shaped cavity of the daughter lens achieve the refraction of the X-ray to focus the X-ray radiation along the minor axis of the parabola. The 2D focusing function of the compound refractive lens for focusing X-rays of the invention is realized by a plurality of the 2D focusing and refractive unit (as shown in FIG. 1c) which is formed by two perpendicularly arranged parabolas (one is along a y axis, and the other is along an x axis). An incident light of X-ray beam is radiated on the compound refractive lens for focusing X-rays along a z axis of a coordinate system, after being refracted by a plurality of the 2D focusing and refractive units, the X-ray exits from the compound refractive lens for focusing X-rays to form a 2D focal spot.

A major axis of the first parabola-shaped hole and the second parabola-shaped hole is 42 μm, a minor axis is 32 μm, l is 50 μm, δ is 1 μm, n is 20, and t is 50 μm. The material of the electroforming cathode film is copper; and the electroforming material is nickel.

Example 2

As shown in FIGS. 1a-2b, manufacturing steps of the compound refractive lens for focusing X-rays in two dimensions are the same as that of Example 1, except that a major axis of the first parabola-shaped hole and the second parabola-shaped hole is 242 μm, a minor axis is 222 μm, l is 250 μm, δ is 2 μm, n is 100, and t is 100 μm. The material of the electroforming cathode film is aluminum; and the electroforming material is nickel.

Example 3

As shown in FIGS. 1a-2b, manufacturing steps of the compound refractive lens for focusing X-rays in two dimensions are the same as that of Example 1, except that a major axis of the first parabola-shaped hole and the second parabola-shaped hole is 200 μm, a minor axis is 180 μm, l is 210 μm, δ is 1.5 μm, n is 80, and t is 80 μm. The material of the electroforming cathode film is gold; and the electroforming material is iron.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for manufacturing a compound refractive lens for focusing X-rays in two dimensions, the compound refractive lens comprising a mother lens and a daughter lens, and the method comprising preparation of the mother lens, preparation of the daughter lens, and assembly of the mother lens and the daughter lens, wherein:

1) the preparation of the mother lens comprises:

a) using a glass substrate-chrome material to prepare a photolithographic mask of the mother lens by using an electron beam lithography; the photolithographic mask of the mother lens comprising a plurality of first parabola-shaped holes and a plurality of square holes arranged coaxially at intervals; a cross section of each of the first parabola-shaped holes being formed by connecting openings of two symmetrical parabolas; the number of the square holes being n, and a side length of the square hole being 1+δ, wherein n is an integer from 20 and 100, and δ is within the range of between 1 and 2 μm;

b) cleaning a glass substrate;

c) depositing a copper, aluminum, or gold film on the cleaned glass substrate as an electroforming cathode film using a sputtering method or an evaporation method;

d) spin coating a layer of a BP212 positive photoresist on the electroforming cathode film; baking, and curing the positive photoresist;

e) spin coating a layer of a SU-8 photoresist having a thickness of 1 on the BP212 positive photoresist;

f) exposing, developing, and hardening the coated SU-8 photoresist using the photolithographic mask of the mother lens prepared in step a);

g) washing a first sample piece obtained from step f), and removing an exposed BP212 positive photoresist from an upper surface of the sample piece;

h) placing the first sample piece treated by step g) in an electroforming solution for electroforming, the electroforming material being copper, nickel, iron, or chromium;

i) taking the first sample piece out of the electroforming solution when a thickness of the electroforming material is the same as the thickness of the SU-8 photoresist, both being 1; and washing the first sample piece to remove remaining electroforming solution;

j) immersing the first sample piece in an acetone solution; removing the BP212 positive photoresist and the SU-8 photoresist adhering on the BP212 photoresist to yield the mother lens;

2) the preparation of the daughter lens comprises:

k) using a glass substrate-chrome material to prepare a photolithographic mask of the daughter lens by using the electron beam lithography; the photolithographic mask of the daughter lens comprising a clamping arm and a plurality of square embedded lens bodies coaxially arranged on the clamping arm; the number of the square embedded lens bodies being n, which is the same as the number of the square holes of the mother lens; each of the square embedded lens bodies comprising a second parabola-shaped hole having a cross section formed by connecting openings of two symmetrical parabolas; a center of the second parabola-shaped hole and a center of the square embedded lens body coincide; the square embedded lens body having a side length of 1; the square embedded lens body and the clamping arm being integrated as a whole body; and a thickness of the clamping arm being t;

l) cleaning a silicon substrate;

m) spin coating a layer of BP212 photoresist on a surface of the silicon substrate; and pre-baking the silicon substrate to yield a second sample piece;

n) depositing a copper, aluminum, or gold film on the second sample piece obtained from step m) as an electroforming cathode film using the sputtering method or the evaporation method;

o) spin coating a layer of KMP C5315 photoresist on the second sample piece from step n);

p) spin coating a layer of SU-8 photoresist having a thickness of 1 on the second sample piece from step o);

q) exposing, developing, and hardening the coated SU-8 photoresist using the photolithographic mask of the daughter lens prepared in step k);

r) removing an exposed KMP C5315 photoresist from an upper surface using a degumming agent of KMP C5315;

s) placing the second sample piece treated by step r) in an electroforming solution for electroforming, the electroforming material being copper, nickel, iron, or chromium but different from the material of the electroforming cathode film;

t) taking the second sample piece out of the electroforming solution when a thickness of the electroforming material is the same as the thickness of the SU-8 photoresist, both being 1; and washing the second sample piece to remove remaining electroforming solution;

u) immersing the second sample piece in an acetone solution; removing the KMP C5315 photoresist and the SU-8 photoresist adhering on the KMP C5315 photoresist, and meanwhile removing the BP212 photoresist and the silicon substrate;

v) removing the electroforming cathode film from the second sample piece after treatment of step u) using a method of chemical etching to yield the daughter lens; and 3) the assembly of the mother lens and the daughter lens comprises:

w) placing the mother lens and the daughter lens beneath a microscope, finding and clamping the clamping arm of the daughter lens, aligning the square embedded lens bodies of the daughter lens with the square holes of the mother lens, respectively, for allowing the first parabola-shaped holes and the second parabola-shaped holes to form an orthogonal structure and allowing the n square embedded lens bodies of the daughter lens to fit the n square holes of the mother lens, respectively; and inserting and pressing the square embedded lens bodies into the corresponding square holes, respectively.

2. The method of claim 1, wherein a distance between the center of the first parabola-shaped hole and the center of the square hole in step a) is 1; and a distance between adjacent square embedded lens bodies in step k) is 1.

3. The method of claim 2, wherein major axes of the first parabola-shaped hole and the second parabola-shaped hole are between 42 and 242 μm; minor axes of the first parabola-shaped hole and the second parabola-shaped hole are between 32 and 222 μm; l is in a range of between 50 and 250 μm; and t is in a range of between 50 and 100 μm.

4. The method of claim 1, wherein major axes of the first parabola-shaped hole and the second parabola-shaped hole are between 42 and 242 μm; minor axes of the first parabola-shaped hole and the second parabola-shaped hole are between 32 and 222 μm; l is in a range of between 50 and 250 μm; and t is in a range of between 50 and 100 μm.

\* \* \* \* \*